Dec. 21, 1965  G. N. BOWMAN-SHAW  3,224,613
TRANSPORT VEHICLES
Filed March 26, 1964  2 Sheets-Sheet 1
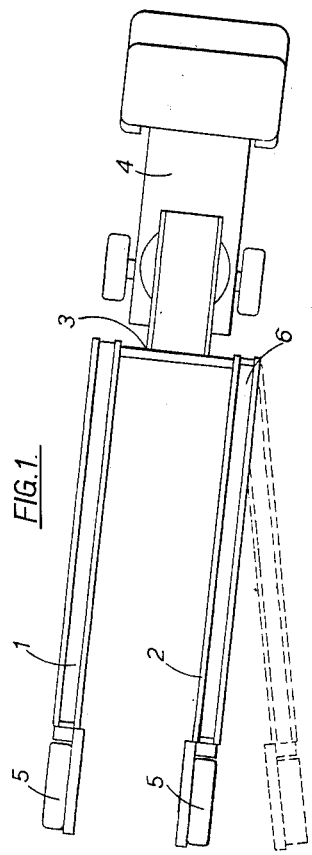
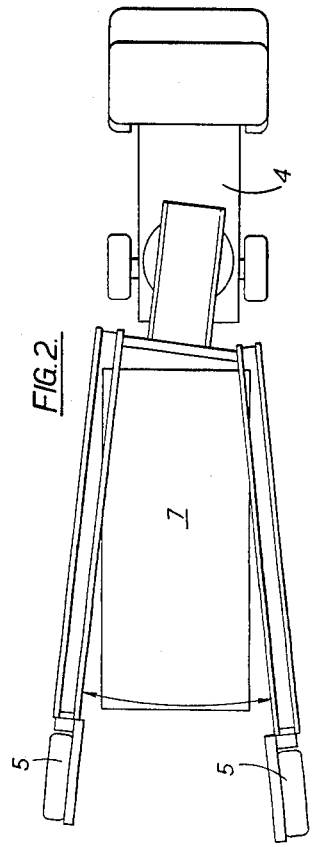
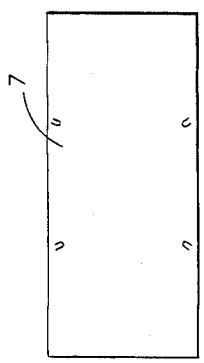
*Inventor*
GEORGE N. BOWMAN-SHAW
By *Emerie & Smiley*
*Attorneys*

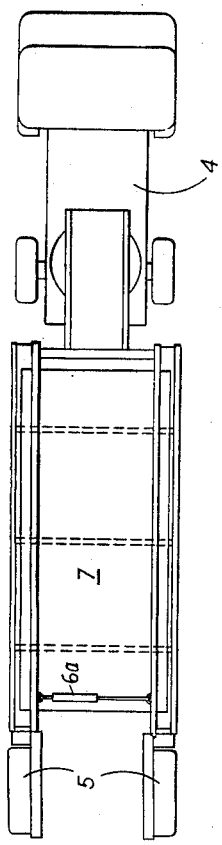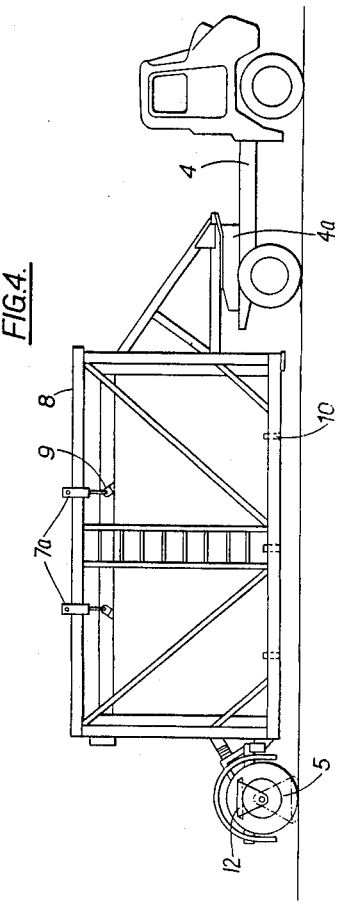

United States Patent Office 3,224,613
Patented Dec. 21, 1965

3,224,613
TRANSPORT VEHICLES
George Neville Bowman-Shaw, Toddington, England, assignor to Lancers Machinery Limited, Leighton Buzzard, England, a corporation of Great Britain
Filed Mar. 26, 1964, Ser. No. 355,017
Claims priority, application Great Britain, Mar. 29, 1963, 12,568/63
4 Claims. (Cl. 214—396)

This invention relates to vehicles for transporting large single item loads such as, for example, bulky containers or packing-cases.

Hitherto heavy loads such as bulky containers, such as are mounted on railway waggons and lifted onto road vehicles, have been provided with hooks by which they can be lifted by cranes off the vehicles, but this necessitates the use of heavy and costly equipment and can only be carried out at suitable sites such as railway goods yards. Alternatively vehicles have been provided with inverted U-shaped frames the lower ends are supported on wheels, which are driven over the containers and then lifted by elevating means on the frames: however since the containers are usually the full permitted width of road or rail vehicles, the additional width of the U-frames has made such vehicles unsuitable for general road or rail use.

It is the main object of this invention to provide such a vehicle which may be loaded and unloaded much more readily than hitherto, if necessary by one man without the need for any equipment other than that with which the vehicle is provided.

According to the present invention, a vehicle comprises a body having two spaced sides arranged to be spread apart to enable a load to be positioned between the sides.

It will normally be most convenient to provide the vehicle with no floor or tail board or rear doors. A removable floor or tail board or the like could however be provided if desired.

Preferably the vehicle also includes means for lifting the load clear of the ground, or other surface on which it is placed, to the position in which it will be carried. Most conveniently the load is arranged to be supported by beams or the like inserted under the load after it has been raised, and on to which the load is subsequently lowered.

Normally, having spread the sides in order to position a load between them, the sides will be returned to their initial relationship before the load is raised.

Preferably the sides are adapted to be spread by arranging for one side to be pivoted at its front end. In order to position a load between the sides the vehicle may simply be reversed with the sides spread apart to move them into position on either side of the load. Although the load will commonly be placed on the ground, it will be understood that the load could equally well be arranged on a trolley or other conveyor means such as, for example, a roller track. In the case of a trolley, the load could be moved to the vehicle, although this would in most cases be unnecessary or inconvenient, whereas, when the load is arranged on a roller track, the vehicle would have to be reversed up to the delivery end of the track with the sides extending on either side thereof.

The vehicle may take the form either of a trailer, semi-trailer or a front wheel drive lorry, the rear wheels of the lorry or trailer being separately secured to the rear ends of the sides thereof.

The precise means used to pivot one side of the body about its front end outwardly of the other side is a matter of choice and may include any appropriate motor or mechanical means, but preferably hydraulic means are employed. Similarly the means for raising the load clear of the ground is a matter of choice but again preferably hydraulic means are provided, for example, hydraulic jacks arranged to operate between the top of the sides and the top of the load.

To enable the invention to be more clearly understood one embodiment in accordance therewith will now be described by way of example with reference to the accompanying drawings of a vehicle comprising a semi-trailer in which:

FIGURE 1 is a plan view indicating the manner in which one side of the body of the vehicle may be splayed outwardly with respect to the other;

FIGURE 2 is a view similar to FIGURE 1 showing the manner in which the vehicle can be reversed on to a load with the sides splayed apart;

FIGURE 3 is a view similar to FIGURE 2 showing the sides closed on to the load; and FIGURE 4 is a side elevation of the vehicle of FIGURES 1-3.

Referring to the drawings, a vehicle comprises a semi-trailer having a body made up of two sides 1 and 2 and a front member 3, whereby the trailer may be coupled to a lorry or tractor in the conventional manner indicated at 4 as by a fifth wheel coupling 4a. The body is open at the rear and is provided with no roof or floor, the rear wheels 5 being separately secured to the rear ends of the sides.

The side 2 is pivoted to the front member 3 at 6 and means such as hydraulic jacks 6a are provided for pivoting the side 2 about its front end from or to a position indicated in full lines in which the side 2 lies parallel to the side 1 to or from a position indicated in dotted lines in which the side 2 is splayed outwardly with respect to the side 1. The side 1 may equally be outwardly splayed if desired. When on the road the sides of the vehicle will of course be held in parallel relationship.

In order to pick-up a load such as indicated at 7, the vehicle is first positioned as indicated in FIGURE 1 with respect to the load, the side 2 is unlocked and splayed outwardly, and then the vehicle is reversed towards the load, to position the load between the sides as indicated in FIGURE 2. In some cases the side 2 may be unloaded and the vehicle reversed, when the side 2 will splay outwardly on its own. The sides are then brought back into alignment again as indicated in FIGURE 3 whereafter the load is raised clear of the ground and secured in position.

As already indicated in order to lift the load clear of the ground hydraulic rams 7a or the like, such as electric motors and chains, are secured to the top member 8 of the sides and are arranged to be coupled to the load by, for example, shackles 9, fast with the upper surface of the load. Having raised the load by these means to the required extent, rods or beams 10 are inserted under the load transversely of and supported by the sides, after which the load is lowered on to beams, and the vehicle is ready for transport.

Clearly, means must be provided for holding the side 2 in position in its splayed position whilst the lorry is reversed to prevent it splaying further than required.

When the vehicle is reversed with one of the sides splayed the tyre of the wheel on the splayed side will tend to scrub. This it is thought will not normally cause any difficulty for the distance that it is necessary to reverse the vehicle with the sides splayed is relatively short, it need not be more than twice the length of the load and, of course, the vehicle will not be loaded. If however, this scrubbing of the rear tyres is found to cause an unacceptable amount of wear then a castored trolley may be inserted under the rear wheel of the splayed side, or, indeed, under both the rear wheels. Or a skid pan 12 may be provided on the wheel axle and normally held up off the road, but for the splaying operation the skid pan can drop so that the road wheel runs over it.

While the vehicle in accordance with this invention is primarily intended for use in picking-up and transporting bulky single item loads in the form of large containers or packing-cases, it will be understood that there is no reason why, if these are of an appropriate size, more than one may be loaded on to the vehicle at any one time.

Although in the embodiment described above the only arrangement described for spreading the sides of the vehicle body comprises pivoting one side at its front end, clearly other arrangements can be envisaged; thus, one side could be arranged bodily to be moved away from or towards the other.

One advantage of a vehicle in accordance with the present invention is that by arranging for the sides to be spread apart in order to position a load between them it is possible to transport loads on a semi or fully self-loading vehicle of lesser overall width than would otherwise be possible. It has been found that a splay of 6° is sufficient for loading purposes.

When, as is normally intended should be the case, the means for spreading the sides and for raising a load comprise hydraulic rams or the like, these may conveniently be arranged to be supplied with pressure fluid from a pump or power take-off driven by the engine of the vehicle, or the tractor which is arranged to tow it.

It is clear that a vehicle in accordance with the embodiment described above may be modified in a variety of ways, or provided with a number of additional components.

Thus for example it may be found desirable to provide a number of telescopic tie bars, extending between the top edges of the sides, to give the sides the required stiffness and prevent them splaying or leaning to one side or the other. When such telescopic tie bars are employed, they may include an hydraulic cylinder for opening and closing the sides.

It may also be found necessary to provide ties between the lower edges of the sides. The beams 10 on which a load is supported may be arranged to serve this purpose, or separate tie means may be provided which might conveniently be hinged to one side. Auxiliary locking devices may also be provided for holding the sides in alignment.

The vehicle may be given a roof, rigidly fixed for example to one side. It will be seen that by the invention the vehicle is manoeuvred to the load and can be operated by one man, whereas in existing construction the reverse is the case.

I claim:

1. An elongated trailer vehicle having a longitudinal axis comprising a front end mounting having means for pivotal connection to and support by a towing vehicle, a front frame member extending substantially transverse to the longitudinal axis of the vehicle and made fast with said mounting, two spaced side frame members of substantial height extending rearwardly from said front frame member, one of said side frame members being fixed to said front frame member, a vertical pivotal connection between the forward end of the other side frame member and said front frame member to permit lateral outward splaying of the pivoted side frame member with respect to said fixed side frame member, power operated means to pivot said pivoted side frame member about said connection, a rear road wheel mounted on and supporting the rear end of each of said side frame members, skid means on said pivoted side frame member movable to a position between the associated wheel and the ground to raise said associated wheel off the road surface during splaying and re-aligning movements of the pivoted side frame member thereby avoiding scrubbing tire wear, lifting means supported on the upper portions of said side frame members to raise a load to a position therebetween, and means insertable under a load and between said side frame member for supporting a load in an elevated position within said side frame members.

2. An elongated trailer vehicle having a longitudinal axis comprising a front end mounting having means for pivotal connection to and support by a towing vehicle, a front frame member extending substantially transverse to the longitudinal axis of the vehicle and made fast with said mounting, two spaced side frame members secured to and extending rearwardly from said front frame member, a vertical pivotal connection between the forward end of at least one side frame member and said front frame member to permit lateral outward splaying of the pivoted side frame member with respect to the other side frame member, power operated means to pivot said pivoted side frame member about said connection, a rear road wheel mounted on and supporting the rear end of each of said side frame members, lifting means supported on said side frame members to raise a load to a position therebetween, means insertable under a load and between said side frame member for supporting a load in an elevated position within said side frame members, and skid means on the wheel mounted on the pivoted side frame member and movable to a position between the wheel and ground, whereby to raise said last wheel off the road surface during splaying and re-aligning movements of the pivoted side frame thereby avoiding scrubbing wear on the associated wheel tire.

3. A trailer vehicle according to claim 2 wherein said power operated means to pivot said pivoted side frame member comprises a hydraulic ram connected at one end to the fixed side frame member and at the other end to the pivoted side frame member, whereby to spread the said frame members and return them into parallel relationship.

4. An elongated trailer vehicle having a longitudinal axis comprising a front end mounting having means for pivotal connection to and support by a towing vehicle, a front frame member extending substantially transverse to the longitudinal axis of the vehicle and made fast with said mounting, two spaced side frame members secured to and extending rearwardly from said front frame member, a vertical pivotal connection between the forward end of at least one side frame member and said front frame member to permit lateral outward splaying of the pivoted side frame member with respect to the other side frame member, power operated means to pivot said pivoted side frame member about said connection, a rear road wheel mounted on and supporting the rear end of each of said side frame members, lifting means supported on said side frame members to raise a load to a position therebetween, means insertable under a load and between said side frame member for supporting a load in an elevated position within said side frame members, and wheel support means insertable between the wheel associated with said pivoted side frame member and the ground to raise said last wheel off a road surface during splaying and re-aligning movements of the pivoted side frame thereby avoiding scrubbing wear on the associated wheel tire.

References Cited by the Examiner
UNITED STATES PATENTS

| | | | |
|---|---|---|---|
| 1,423,947 | 7/1922 | Kramer et al. | |
| 2,547,269 | 3/1951 | Kinsey | 214—390 |
| 2,657,938 | 11/1953 | Browne et al. | 214—394 X |
| 2,896,803 | 7/1959 | Clifton | 214—396 |
| 3,103,371 | 9/1963 | Young | 280—414 |
| 3,145,864 | 8/1964 | Arnold | 214—396 |

GERALD M. FORLENZA, *Primary Examiner.*